United States Patent [19]

Ratkowski et al.

[11] Patent Number: 4,535,138

[45] Date of Patent: * Aug. 13, 1985

[54] SILANE ESTER CONTACT LENS COMPOSITION, ARTICLE AND METHOD OF MANUFACTURE

[75] Inventors: Donald J. Ratkowski, Mesa; Ping-Chang Lue, Scottsdale, both of Ariz.

[73] Assignee: Paragon Optical, Inc., Mesa, Ariz.

[*] Notice: The portion of the term of this patent subsequent to Dec. 6, 2000 has been disclaimed.

[21] Appl. No.: 438,904

[22] Filed: Nov. 1, 1982

[51] Int. Cl.$^3$ .................... C08F 30/08; C08F 130/08; C08F 230/08
[52] U.S. Cl. .................................... 526/279; 523/106
[58] Field of Search ...................... 526/279; 523/106

[56] References Cited

U.S. PATENT DOCUMENTS

| 4,152,508 | 5/1979 | Ellis et al. | 526/279 |
| 4,216,303 | 8/1980 | Novicky | 526/279 |
| 4,259,467 | 3/1981 | Keough et al. | 526/279 |
| 4,419,565 | 8/1983 | Ratkowski et al. | 526/279 |

FOREIGN PATENT DOCUMENTS

WO80/00253 2/1980 PCT Int'l Appl. ................ 523/107

*Primary Examiner*—Joseph L. Schofer
*Assistant Examiner*—Peter F. Kulkosky
*Attorney, Agent, or Firm*—Richard R. Mybeck

[57] ABSTRACT

A copolymer composition, especially adapted for use in fabricating a contact lens comprises a copolymer of comonomers which include about 1-95 parts by weight of hydroxy silane esters of acrylic or methacrylic acid having a silanol functionality of 10-20% and about 99-5 parts by weight of a $C_1$-$C_{20}$ alkyl ester of acrylic or methacrylic acid. Contact lenses and contact lens buttons are formed of such copolymer by conventional techniques and also by injection molding and by compression molding.

8 Claims, No Drawings

SILANE ESTER CONTACT LENS COMPOSITION, ARTICLE AND METHOD OF MANUFACTURE

The present invention relates to new and unique copolymer compositions, methods for handling said copolymers to mold or cast them into contact lenses or blanks from which contact lenses may be shaped, and to the buttons and lenses resulting therefrom.

More particularly, the present invention relates to novel copolymer compositions having distinctly improved wettability, mechanical stability and optical clarity from which greatly improved contact lenses, or the buttons from which contact lenses may be shaped, are formed by either conventional forming techniques or by injection molding or compression casting, and to the shaped lenses and buttons created therefrom.

Furthermore, this invention concerns oxygen-permeable copolymers which have improved wettability and mechanical stability, which can be used to manufacture contact lenses by industry-standard manufacturing techniques and also by injection molding or casting, which lenses can be cleaned with standard hard and soft contact lens cleaning solutions and do not require special surface treatments to impart wettability.

So-called "hard" contact lenses and compositions for fabricating them are well known in the art. The standard contact lens used for many years is fabricated from polymethyl methacrylate (PMMA) and has achieved widespread use throughout the world, despite the fact that the PMMA lenses are essentially impermeable to oxygen. The lack of oxygen at the interface between the contact lens and the cornea will, after short periods of time, even less than one day, cause discomfort to the wearer because of edema induced by the lack of oxygen at the surface of the cornea. Consequently, PMMA lenses must be removed at least daily and preferably more often to expose the surface of the cornea to ambient atmospheric oxygen and thereafter replaced, a bothersome procedure.

In an attempt to remedy these defects inherent in standard PMMA contact lenses, the art has devised other copolymer contact lens compositions having improved oxygen-permeability which allow the user to wear the lenses for longer periods of time, upwards of several days, before they must be removed for cleaning. These oxygen-permeable lenses are of two general types, the so-called "soft"]lens formed of the very flexible Hydrogel ® material and the so-called "hard permeable" lens formed of a solid copolymer of polymethyl methacrylate with various comonomers. The hard permeable lenses avoid certain problems associated with the so-called soft lens, principally in their resistance to contamination and breakage, their ease of cleaning and their resistance to surface scratching.

Although the hard permeable contact lens compositions do represent a marked improvement over standard PMMA polymers in terms of oxygen-permeability, they nevertheless suffer certain disadvantages in comparison to standard PMMA lenses in terms of wettability, mechanical stability and chemical stability. Moreover, certain of the present hard permeable copolymers require special surface pre-treatment to improve wettability and/or special lens treatment solutions which are used throughout the life of the lens to improve or maintain surface properties. Furthermore, the hard permeable copolymers are inherently brittle with the result that they frequently chip at their edges and break. Such chipping obviously creates a potential health hazard to the wearer and imposes a definite economic burden because they must be replaced.

Accordingly, a definite need exists for and it would be highly advantageous to provide a hard oxygen-permeable contact lens composition, lenses manufactured thereof, and methods for manufacturing lenses or lens blanks (buttons) therefrom, all of which could provide contact lenses having at least the oxygen-permeability characteristic exhibited by presently available hard permeable lenses, which would have improved wettability, and which would provide significant production economies, especially if such composition can be used to manufacture contact lenses or buttons therefor, using not only the standard procedures and equipment already known for manufacture of PMMA lenses, but using injection molding or casting in such a way that special surface pre-treatments or periodic surface treatments to attain and maintain the desired surface properties are no longer required.

We have now discovered contact lens copolymer compositions, contact lenses fabricated therefrom and methods for manufacture of contact lenses employing such compositions which achieve these desired objectives in a remarkably unexpected fashion as will be readily discerned from a detailed reading of the following disclosure and examples thereof.

Briefly stated, the contact lens composition of the present invention comprises a copolymer of comonomers which include (a) mixture of methyacrylate silane or acrylate silane having a silanol functionality of from 10-20% by weight; and (b) alkyl esters of acrylic or methacrylic acid. The silane mixture (shown as item a) contains two components, either as (i) methacrylate silane and hydroxy methacrylate silane or (ii) acrylate silane and hydroxy acrylate silane. Optionally, the overall composition may also contain, in a discrete amount as will be hereafter described, of an alkyl-alkoxy silane.

The invention also provides, as new articles of manufacture, contact lenses fabricated from these copolymers and new methods of manufacturing contact lenses obtained by injection molding, compression molding or casting these copolymers to the desired contact lens shape or into a contact lens button from which a contact lens may be shaped.

The invention will be best understood by reference to the prior art.

The closest prior art known to us consists of the copolymers and articles of manufacture described in U.S. Pat. No. 3,808,178 to Gaylord, issued Apr. 30, 1974, entitled "Oxygen-Permeable Contact Lens Composition, Method and Article of Manufacture". Contact lenses fabricated from compositions such as those described in the Gaylord patent are marketed commercially under the trademark "Polycon ®". The copolymers described in the Gaylord patent are copolymers of polysiloxanyl acrylic esters and an alkyl acrylic ester. Gaylord also discloses that other comonomers can be employed to improve certain physical properties of his copolymers, such as acrylic or methacrylic acid to improve the wettability of the copolymer, and ethylene glycol dimethacrylate, a cross-linking comonomer, to improve the rigidity of the copolymer.

Other known hard oxygen-permeable contact lens copolymers of silicones and acrylic esters are disclosed in the U.S. patents to Ellis et al., U.S. Pat. No. 4,168,122 (known in the industry as the "Boston Polymer") and U.S. Pat. No. 4,152,508; and in the U.S. patents to Novicky, U.S. Pat. No. 4,216,303 (known in the industry as the Sil-O₂-Flex ™ polymer) and U.S. Pat. No. 4,242,483.

The Ellis patents disclose contact lens copolymers of acrylic esters, siloxanylalkyl esters, an itaconate mono- or diester, a cross-linking agent such as ethyl glycol-dimethylacrylate, and a hydrophilic monomer such as 2-hydroxyethyl methacrylate. Ionic charges are established on the surfaces of lenses fabricated from these compositions by treating the lenses with a solution which forms a hydrophilic polyelectrolyte hydrogel complex on the surface of the lens.

The Novicky copolymers are generally similar to the Gaylord and Ellis copolymers but employ generally much more highly branched silicone comonomers.

While the contact lens copolymers of the present invention bear similarities to the Gaylord, Ellis and Novicky copolymers (in that they are copolymers of alkyl acrylic esters with acrylic silane esters), they differ significantly in that the silanol components of this invention contain a hydroxy acrylic or hydroxy methacrylic silane ester and, optionally, an alkyl-alkoxy silane. In addition, the silane monomers disclosed by Gaylord, Ellis and Novicky for optional property enhancement are compatible with and therefor may be incorporated in our copolymer, if desired, but they are not required.

The hydroxyacrylic silane ester or hydroxy methacrylic silane ester mixture of the present invention when combined, as indicated with acrylic or metharylic alkyl esters, yield a copolymer which has distinctly improved wettability and mechanical stability, and one which enables one to manufacture contact lenses, or buttons therefor, by those industry-standard techniques known in connection with the manufacture of PMMA lenses, and enables one to care for and clean the lenses fabricated therefrom with standard hard and soft contact lens cleaning solutions. The mechanical stability of our copolymer also provides lenses having improved stability of lens curvature which affects focus distance and sharpness. No surface treatment is required to improve lens wettability and no special cleaning solutions are required to maintain surface properties.

In general, the contact lens copolymer compositions of the present invention are formed by copolymerizing comonomers which include about 1–95 parts by weight of a mixture of a silanol ester containing from 10–20 percent of a silanol functionality, and correspondingly, about 99–5 parts by weight of a $C_1$–$C_{20}$ alkyl ester of acrylic or methacrylic acid. "Silanol functionality" as used herein defines the ratio of the molecular weight of the Si—OH moiety divided by the molecular weight of the silanol ester.

The hydroxy silane esters which are useful as comonomers in forming the copolymer of the present invention are of the generalized structure

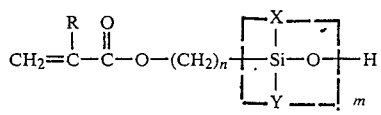

Wherein:
R=CH₃—, H—;
X,Y=$C_1$–$C_6$ alkyl, phenyl,Z;

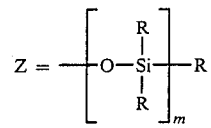

n=1–3
m=1–2.

Representing hydroxy silane esters of this type include:
hydroxy-bis(trimethylsiloxy)-γ-methacryloxypropyl silane
hydroxy-methyl(trimethylsiloxy)methacryloxymethyl silane
hydroxy-methyl(trimethylsiloxy)-β-methacryloxyethyl silane
hydroxy-methyl(trimethylsiloxy)-γ-methacryloxypropyl silane
hydroxy-bis(trimethylsiloxy)-β-methacryloxyethyl silane
hydroxy-bis(trimethylsiloxy)-methacryloxy methyl silane
hydroxy-(trimethylsiloxy)-(pentamethyldisiloxy)methacryloxy-methysilane
hydroxy-(trimethylsiloxy)-(pentamethyldisiloxy)-β-methacryloxyethyl silane
hydroxy-(trimethylsiloxy)-(pentamethyldisiloxy)-γ-methacryloxypropyl silane.

The alkyl-alkoxy silanes which are useful as comonomers in forming the copolymer of the present invention have the general structure

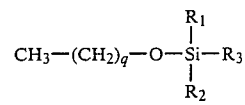

where
$R_1$, $R_2$ and $R_3$ = $C_1$–$C_6$ Alkyl,
q = 0–1.

Representative alkyl alkoxy silanes of this type include:
trimethyl-ethoxy-silane
trimethyl-methoxy-silane
dimethyl-(trimethylsiloxy)-methoxy-silane
dimethyl-(trimethylsiloxy)-ethoxy-silane
dimethyl-(pentamethyldisiloxy)-methoxy-silane
dimethyl-(phenyltetramethyldisiloxy)-methoxy-silane.

The $C_1$–$C_{20}$ alkyl esters of acrylic or methacrylic acid which are useful as comonomers in forming the copolymer of the present invention include:
methyl acrylate and methyl methacrylate
ethyl acrylate and ethyl methacrylate
propyl acrylate and propyl methacrylate
isopropyl acrylate and isopropyl methacrylate
butyl acrylate and butyl methacrylate
amyl acrylate and amyl methacrylate
hexyl acrylate and hexyl methacrylate
heptyl acrylate and heptyl methacrylate
octyl acrylate and octyl methacrylate
2-ethylhexyl acrylate and 2-ethylhexyl methacrylate
nonyl acrylate and nonyl methacrylate
decyl acrylate and decyl methacrylate
undecyl acrylate and undecyl methacrylate
lauryl acrylate and lauryl methacrylate
cetyl acrylate and cetyl methacrylate octadecyl acrylate and octadecyl methacrylate cyclohexyl methacrylate and cyclohexyl acrylate.

The copolymers of the invention are prepared by admixing the mixture of comonomers with a catalyst/initiator. Our preferred initiator is a free-radical-generating-polymerization-initiator of the type commonly used in polymerizing ethenyl functioning unsaturated compounds. Representative free radical polymerization initiators include:
acetyl peroxide
lauroyl peroxide
decanoly peroxide
caprylyl peroxide
benzoyl peroxide
tertiarybutyl peroxypivalate
diisopropyl peroxycarbonate
tertiarybutyl peroctoate
$\alpha,\alpha'$,-azobisisobutyronitrile
methylethyl ketone peroxide
di(2-phenoxyethyl)peroxydicarbonate
di(2-phenoxyethyl)methylethyl ketone peroxide.

Conventional polymerization techniques are employed to produce the novel copolymers. The comonomer mixture containing between about 0.05-2% by weight of the free radical initiator is heated to a temperature between 30° C.-100° C., preferably below 70° C., to initiate and complete the polymerization.

The polymerization mixture can be heated in a suitable mold or container to form discs, rods or sheets which can then be machined to the desired shape using conventional equipment and procedures employed for fabricating lenses from polymethyl methacrylate. The temperature is preferably maintained below 70° C. in order to minimize the formation of bubbles in the copolymer. Instead of employing the bulk polymerization techniques described above, one can employ solution, emulsion or suspension polymerization to prepare the novel copolymers, using techniques conventionally used in the preparation of polymers from vinyl functioning unsaturated monomers ($-CH=CH_2$), that is, ethenyl-functioning monomers. The copolymer thus produced may be extruded, pressed or molded into rods, sheets or other convenient shapes which are then machined to produce the contact lenses. Alternatively, the copolymer can be directly cast or molded into finished contact lenses or lens blanks with convex or concave surfaces.

In a preferred practice of the present invention, the monomer mixture is thermally polymerized in an appropriate mold or vessel to provide a block, sheet, rod, or plug, each of which may have a radius convex or radius concave or a plano surface, to provide a semifinished or finished contact lens or other optical lens. The mold and vessel utilized will be formed of polypropylene, polyethylene, nylon, teflon, glass, or aluminum having its mold surface coated with teflon. As will hereinafter appear, certain applications are well served using glass test tubes or rods as the forming mold.

If the wettability of the copolymers described above is lower than desired, this property can be improved by the addition to the copolymerization mixture of from about 1-20 parts by weight of a hydrophilic monomer. Such monomers include hydroxyalkyl acrylates and methacrylates wherein the alkyl group contains about 1 to 4 carbon atoms, acrylic and methacrylic acid, acrylamide, methacrylamide, N-methylolacrylamide, N-methylolmethacrylamide, glycidyl acrylate and methacrylate and N-vinyl-pyrrolidone.

The resistance of contact lenses fabricated from the copolymer of the present invention to lens flexure and warpage may be increased, if desired, by the incorporation into the copolymerization mixture of about 1-2 parts by weight of an acrylic ester of a $C_1$-$C_{20}$ alkyl polyol such as, for example, ethylene glycol dimethacrylate, butylene glycol dimethacrylate, neopentyl glycol diacrylate and pentaerythritol triacrylate or tetraacrylate.

The principal function of the hydroxy silane ester moiety of the copolymer of the present invention is to improve the mechanical properties of conventional PMMA contact lens polymers. It appears that the inclusion of the hydroxy silane ester as one of the comonomers in the polymerization mixture chiefly affects the warpage characteristics of the copolymer which, in turn, as previously noted, determines the stability of lens curvature which controls focus distance and sharpness. In additon, the hydroxy silane ester moiety of the copolymer imparts significantly improved oxygen permeability. Consequently, although the hydroxy silane ester component of the copolymerization mixture, that is, the mixture of a silicone ester containing a silanol functionality (10%-20%) may be varied within the 1-95 parts by weight of as set forth above, the preferred combination of mechanical and oxygen-permeability properties is achieved by employing about 1-10 parts by weight of the hydroxy silane ester in the copolymerization mixture. Higher proportions of this component can be employed but with some sacrifice in the optical properties of the copolymer.

The optional alkyl-alkoxy silane component of the copolymerization mixture is incorporated in order to effect as in situ adjustment of the hydroxy silane content of the copolymeriztion mixture. As often commercially supplied, the hydroxy silane component can contain substantial proportions of other silane esters. The alkyl-alkoxy silane may be added to the copolymerization mixture to convert a portion of the hydroxy silane to the corresponding silane ester, according to the generalized reaction

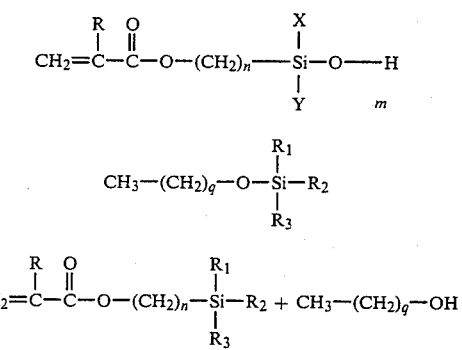

wherein m, n, q, X and Y have the meanings previously assigned, and Z=X or Y.

Accordingly, the alkyl-alkoxy silane component of the copolymerization mixture can be varied from 0 parts by weight up to a stoichiometric proportion which will leave about 1 part by weight of the mixture of the silane ester containing from 10-20 percent of a silanol functionality in the unreacted state according to the equation above.

The hydrophilic monomer content of the copolymerization mixture is preferably 2-6 parts by weight and the proportion of the alkyl polyol component is preferably 3-8 parts by weight.

Within the foregoing limitations, the proportion of $C_1-C_{20}$ alkyl esters of acrylic or methacrylic acids in the copolymerization mixture is, correspondingly, preferably 25-60 parts by weight.

The particular free radical polymerization initiator employed in accordance with the preferred practice of the invention is selected by reference to the required initiation temperature. Thus, if conventional polymerization techniques are employed to produce cast rods or other shapes which are then machined to produce the contact lenses, the preferred initiators are α,α',-azobisisobutyronitrile, di(2-phenoxyethyl)peroxydicarbonate, and the like.

On the other hand, if it is desired to produce contact lenses or contact lens blanks by injection molding or direct casting, then a polymerization initiator having a higher intiation temperature would be employed in order to prevent premature polymerization in the injection molding or casting cavities. Such an initiator can be a mixture of methylethylketoneperoxide, and cobalt naphthanate.

In one practice of the present invention, a copolymerization mixture is prepared by mixing the following comonomers, in the relative weight ratios indicated, in a plastic container equipped with a conventional stirring and blending device.

A mixture containing a hydroxy silane ester selected from the group consisting of
hydroxy-bis(trimethylsiloxy)-γ-methacryloxypropyl silane,
hydroxy-methyl(trimethylsiloxy)methacryloxymethyl silane,
hydroxy-methyl(trimethylsiloxy)-β-methacryloxyethyl silane,
hydroxy-methyl(trimethylsiloxy)-γ-methacryloxypropyl silane,
hydroxy-bis(trimethylsiloxy)-β-methacryloxyethyl silane,
hydroxy-bis(trimethylsiloxy)-methacryloxy methyl silane,
hydroxy-(trimethylsiloxy)-(pentamethyldisiloxy)-methacryloxy-methylsilane,
hydroxy-(trimethylsiloxy)-(pentamethyldisiloxy)-β-methacryloxyethyl silane, and
hydroxy-(trimethylsiloxy)-(pentamethyldisiloxy)-γ-methacryloxypropyl silane; an alkyl ester of acrylic or methacrylic acid in which said alkyl has 1-20 carbon atoms; a wetting agent, a cross linker and a catalyst/initiator. When, as indicated earlier, the need is present, a discrete amount of an alkyl-alkoxy silane can also be blended into the mixture.

As previously indicated, the copolymerization mixture will preferably contain from about 1-95 parts by weight of the hydroxysilane ester, from about 99-5 parts of $C_1-C_{20}$ alkyl ester of acrylic or methacrylic acid, from 2 to about 8 parts of the wetting agent; from about 3 to about 8 parts of the cross linker; and about 0.1 to about 0.5 parts of catalyst/initiator.

The mixture, when stirred for about 20 minutes, is readily pourable into a preselected mold which may be constructed of polypropylene, polyethylene, nylon, Teflon, glass or aluminum having a molding surface coated with Teflon.

The mold, for example, glass tubes, when filled with the copolymerization mixture is placed into a water or silicone (optional) bath which in turn is placed into a vacuum oven.

Alternatively, the resulting and readily pourable copolymerization mixture can be converted into a solid of the desired shape by pouring into a Teflon coated aluminum tube. In any case, the selected mold will have been thoroughly cleaned, as with a dry brush and an anti-static air gun, to remove all particulates therefrom.

The filled molds are then placed in a water or silicone (optional) bath which in turn is placed into a vacuum oven. The vacuum pump is then started to evacuate air from the oven until a vacuum of approximately 20 mm Hg is obtained at which point the vacuum pump is stopped and the oven is charged with nitrogen until atmospheric pressure is obtained. The evacuation-nitrogen fill cycle is prepared four times after which a very slight nitrogen flow is maintained through the oven.

The oven, containing the filled molds in the nitrogen environment, is heated to 40°-50° C. to commence curing the copolymer and this temperature is maintained for a period of from 12 to 48 hours at which time the oven temperature is raised to 60°-70° C. for an additional 18 to 48 hours. When heating at 60°-70° C. is completed, the oven is cooled to room temperature and the copolymer solids, e.g., rods are removed from their molds (the polymerization tubes) by gently tapping the bottom of each tube.

The copolymer rods, thus removed from their respective molds, are post cured by placing them flat upon suitable trays such as Teflon-coated aluminum trays or the like and returned to the vacuum oven.

The oven is then evacuated to approximately 5 mm Hg and the oven is heated to a temperature in the range of from 100° to about 150° C. for a period of from about 8 to about 36 hours. The duration of the post cure is inversely related to the temperature selected.

After heating for the desired time, the oven is cooled to ambient temperature at which time atmospheric air is slowly admitted into the oven until the oven interior reaches atmospheric pressure.

When the oven is thus cooled and the pressure balanced, the trays containing the post cured rods are removed from the oven and the rods are collected. At this point they are found to be totally and completely uniform.

The rods are then machined to the desired diametric dimension of about ½ inch (13 mm) and then sliced into buttons of approximately 3/16 inch (4 mm) thickness to create ten contact lens buttons (blanks) from each rod.

It should be noted that the copolymerization mixture can be tinted using any of the physiologically compatible color pigments or dyes currently used in PMMA contact lenses. Thus lens having blue, grey, green and brown tints as well as clear lens can be produced by the present invention.

To further aid in the understanding of the present invention but not as a limitation thereupon, reference is made to the following Examples.

EXAMPLE 1

A copolymerization mixture is prepared by mixing the following comonomers in the relative weight ratios indicated in a plastic mixing container and stirring for twenty minutes.

| Comonomer | Parts by weight |
|---|---|
| Silanol | |

-continued

| Comonomer | Parts by weight |
|---|---|
| Hydroxy-bis(trimethylsiloxy)-γ-methacryloxypropyl-silane | 35 |
| Trimethyl-ethoxy-silane | 5 |
| Alkyl Ester Methyl Methacrylate | 44 |
| Hydrophilic Monomer Methacrylic Acid | 8 |
| Cross-Linking Monomer Ethylene Glycol Dimethalcrylate | 8 |
| Catalyst (Initiator) α,α'-azobisisobutyronitrile | 0.2 |

The resulting copolymerization mixture is readily poured into a plurality of thoroughly cleaned (antistatic air gun) Teflon-coated aluminum tubes, each of which presents a cylindrical mold cavity of approximately 15 mm in diameter and 42 mm in length.

The filled tubes are then placed into a water or silicone bath which is, in turn, placed in a vacuum oven. The vacuum pump is started and air evacuation is continued to approximately 20 mm Hg at which time the vacuum pump is stopped and the oven is charged with nitrogen to atmospheric pressure. The evacuation-nitrogen-charge cycle is repeated four times, after which a very slight positive nitrogen flow is maintained through the oven.

The oven containing the molds in the nitrogen environment is then heated to 40°-50° C. for 24-48 hours and thereafter the temperature is increased to 60°-70° C. for an additional 18-36 hours to completely cure the polymer. The oven is thereafter cooled to room temperature and the copolymer rods are removed from the molds or polymerization tubes by gently tapping the bottom of each tube.

The copolymer rods are post-cured by placing them flat in trays which are placed into the vacuum oven. The oven is then evacuated to approximately 5 mm Hg and the oven is heated to 100°-150° C. for 8-36 hours according to Table A-2 below.

TABLE A-2

| Temperature (°C.) | Duration (hours) |
|---|---|
| 100 | 36.0 |
| 105 | 33.2 |
| 110 | 30.4 |
| 115 | 27.6 |
| 120 | 24.8 |
| 125 | 22.0 |
| 130 | 19.2 |
| 135 | 16.4 |
| 140 | 13.6 |
| 145 | 10.8 |
| 150 | 8.0 |

The oven is then cooled to ambient temperature at which time atmosphere air is slowly admitted into the oven until the oven interior reaches atmospheric pressure. The trays containing the post-cured rods are then removed from the oven and the rods are collected. Each rod is then machined to the desired diametric dimension, about 13 mm, and thereafter sliced into a plurality of buttons (lens blanks), each being approximately 4 mm thick.

EXAMPLE 2

Standard Method for Determining Wetting Angle

Ten contact lens buttons (approximately 13 mm in diameter and 4 mm thick) are prepared by slicing one of the copolymer rods produced according to Example 1, "facing" one flat surface of each button with a diamond turning tool and polishing the faced surface to the degree normally acceptable by contact lens standards. After immersing the buttons in a contact lens soaking solution such as benzalkonium chloride (available as SOCLENS ® from Alcon) or the like for 24 hours, each button is thoroughly washed with distilled water, blotted dry, and then thoroughly dried under vacuum in a 40° C. oven for one week. After this preparation, the buttons are subjected to wetting angle determinations as described in the "Standard Method for Determining Wetting Angle" issued by the Contact Lens Manufacturers Association, Chicago, Ill., dated Apr. 10, 1978. Note that the smaller the "wetting angle" (in degrees), the better the tear pump exchange. The results obtained for the ten buttons of this example are reported in Table B, below.

TABLE B

| Button No. | Wetting Angle (Degrees) | Standard Deviation (± °) |
|---|---|---|
| 1 | 30. | 2.0 |
| 2 | 23.3 | 2.0 |
| 3 | 23.7 | 1.5. |
| 4 | 22.0 | 3.0 |
| 5 | 23.3 | 1.5 |
| 6 | 21.0 | 2.0 |
| 7 | 22.7 | 2.3. |
| 8 | 21.0 | 1.0 |
| 9 | 21.0 | 0 |
| 10 | 23.0 | 1.0 |

This data gives an average wetting angle of 23.1° with a standard deviation of ±1.63°.

EXAMPLE 3

For comparison, the wetting angles of other commercially available contact lens polymers and copolymers were determined utilizing the same procedure as described in Example 2. The results are reported in Table C, below:

TABLE C

| Polymer | Wetting Angle Degrees | Standard Deviation (± Degrees) |
|---|---|---|
| PARAGON 95 (Paragon) | 20.4 | |
| PARAGON 18 (Paragon) | 18.3 | 0.49 |
| PMMA #2 (Glassflex) | 25.6 | 1.77 |
| PMMA #4 (Glassflex) | 24.3 | 3.8 |
| Polycon ® (Gaylord-Syntex) | 30.4 | .77 |
| Sil-O$_2$—Flex ® (Novicky) | 25.4 | — |
| Boston (Ellis) (Polymer Tech) | 33.3 | — |

EXAMPLE 4

The contact lens copolymers of Examples 2 and 3 were tested for oxygen-permeability with a Schema-Versatae machine. The results as reported in Table D, below:

TABLE D

| Polymer | O$_2$ Permeability (DK × 10$^{-11}$)* |
|---|---|
| PARAGON 95 (paragon) | >1 |
| PARAGON 18 | <1 |
| PMMA #2 | <1 |
| PMMA #4 | <1 |
| POLYCON (Gaylord) | 3.8 |
| Sil-O$_2$—Flex (Novicky) | 7.5 |
| Boston (Ellis) | 11.1. |

TABLE D-continued

| Polymer | O$_2$ Permeability (DK × 10$^{-11}$)* |
|---|---|
| Example 1 | 12.2 |

*(CM$^2$/sec) (ml O$_2$/ml × mm Hg)

EXAMPLES 5-9

Following the general procedure as described in Example 1, copolymers are prepared which, depending on the specific application, have a desired combination of mechanical strength, optical clarity, oxygen permeability and wettability for use in fabricating contact lenses.

TABLE E

| Comonomer Example: | Parts by weight in copolymerization mixture | | | | |
|---|---|---|---|---|---|
| | 5 | 6 | 7 | 8 | 9 |
| Hydroxy-bis-(trimethylsiloxy) γ-methacryloxypropyl-silane | 35 | 30 | 60 | 20 | 6 |
| Trimethyl-ethoxy-silane | 15 | 10 | 10 | 10 | 4 |
| methyl methacrylate | 40 | 50 | 20 | 60 | 80 |
| Methacrylic acid | 2 | 4 | 3 | 2 | 6 |
| Ethylene glycol dimethacrylate | 8 | 6 | 7 | 8 | 4 |
| Initiator | | | | | |
| α, α', azobisisobutyronitrile | 0.2 | 0.2 | | | |
| di-(2-phenoxyethyl) peroxy-dicarbonate | | | 0.2 | | |
| methyl ethyl ketone peroxide and cobalt naphthanate mixture | | | | 0.2 | 0.2 |

EXAMPLES 10-19

Following the general procedures of Example 1, copolymers are prepared of other comonomers, which, depending on the specific desired balance of properties of mechanical strength, resistance to warpage, optical characteristics, oxygen permeability and wettability, are suitable for use in fabricating contact lenses according to the present invention.

TABLE E

| Comonomer | Parts by Weight in Copolymerization Mixture | | | | | | | | | |
|---|---|---|---|---|---|---|---|---|---|---|
| | Example | | | | | | | | | |
| | 10 | 11 | 12 | 13 | 14 | 15 | 16 | 17 | 18 | 19 |
| A1 | 10 | | | | | 5 | | | | |
| 2 | 50 | 50 | | | 30 | 15 | 20 | 15 | 10 | 6 |
| 3 | | | 45 | 40 | | | | | 5 | |
| B1 | 10 | | | | 10 | | 10 | 5 | | |
| 2 | | | | 10 | | 10 | | | 5 | 5 |
| 3 | | 10 | 15 | | | | | | | |
| C | 20 | 30 | 30 | 40 | 50 | 60 | 60 | 70 | 70 | 80 |
| D1 | 4 | | | | 4 | | | 7 | | |
| 2 | | | | 2 | | | | | 4 | 6 |
| 3 | | 6 | 6 | | | 2 | 3 | | | |
| E1 | 6 | | 4 | 8 | 6 | | 6 | | 6 | |
| 2 | | 4 | | | | 8 | | 3 | | 3 |
| F1 | 0.2 | | | 0.2 | 0.2 | | | | | |
| 2 | | 0.2 | 0.2 | | | | 0.2 | | | 0.2 |
| 3 | | | | | | 0.2 | | 0.2 | 0.2 | |

IDENTIFICATION OF COPOLYMERIZATION
Mixture Components of Examples 10-19

A
1: Hydroxy-methyl-(trimethylsiloxy)methacryloxymethyl-silane
2: Hydroxy-bis(trimethylsiloxy)-γ-methacryloxypropyl-silane
3: Hydroxy-methyl-(trimethyl)-γ-methacryloxypropyl-silane B
1: Trimethyl-ethoxy-silane
2: Trimethyl-methoxy-silane
3: Dimethyl-(trimethylsiloxy)methoxy-silane C: Methyl methacrylate D
1: Methacrylic acid
2: Acrylic acid
3: Acrylamide E
1: Ethylene glycol-dimethacrylate
2: Butylene glycol-dimethacrylate F
1: Di(2-phenyloxyethyl)peroxy dicarbonate
2: α,α',-azobisisobutyronitrile
3: Methylethylketoneperoxide and cobalt naphthanate

EXAMPLE 20

The copolymers of Examples 8, 9, 15, 17 and 18 were found suitable for production of contact lens buttons and contact lenses by injection molding using state of the art machines. For example, these copolymers can be injection molded to form convex or concave surfaced contact lens blank (buttons) or to form contact lenses using the process parameters shown below.

TABLE F

| Mold Temperature | 100° C.-160° C. |
|---|---|
| Injection Pressure | 600 psi-2500 psi |
| Hold Pressure | 50 psi-500 psi |
| Hold Time | 2 sec.-120 sec. |
| Injection Time | 1 sec.-5 sec. |

EXAMPLE 21

The copolymer formulations of Examples 8, 9, 15, 17 and 18 were found suitable for the production of contact lens buttons and contact lens by compression molding using state of the art equipment. Thus, these copolymers can be compression molded to form concave or convex surfaced contact lens buttons or to form contact lenses using the parameters shown below.

TABLE G

| Mold temperature | 100-160° C. |
|---|---|
| Compression pressure | 25-250 psi |
| Hold time | 2-120 seconds |

From the foregoing, it becomes apparent that a new and useful copolymer composition, method for handling said copolymers to mold or cast them into contact lenses or blanks from which contact lenses may be shaped, and the buttons and lenses resulting therefrom have been herein described and illustrated which fulfill all of the aforesaid objectives in a remarkably unexpected fashion, it being understood that such modifications, alterations and adapatations as may readily occur to an artisan having the ordinary skills to which this invention pertains are intended within the spirit of the present invention which is limited only by the scope of the claims appended hereto.

Accordingly, what is claimed is:
1. A copolymer composition especially adapted for use in fabricating a contact lens comprising a copolymer of comonomers including the product resulting when (a) about 5–60 parts by weight of a silane ester containing a silanol functionality of and having the structure:

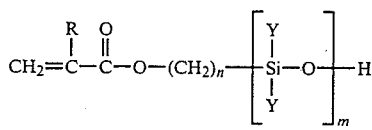

wherein:
R=CH$_3$— and H—;
X,Y=C$_1$–C$_6$ alkyl, phenyl and Z;

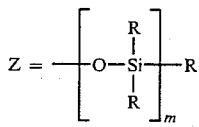

n=1–3
m=1–2
is mixed with 4–15 parts by weight of
(b) an alkylalkoxysilane of the structure

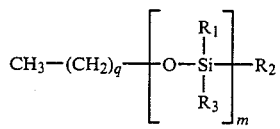

wherein R$_1$, R$_2$, and R$_3$=C$_1$–C$_6$ alkyl, and q=0 or 1; said alkylalkoxysilane being present in the mixture in an amount of less than a stoichiometric proportion with respect to said hydroxy silane ester; and (c) about 80–20 parts by weight of a C$_1$–C$_{20}$ alkyl acid ester selected from the group consisting of acrylic and methacrylic acid.

2. A composition according to claim 1 containing from about 2 to about 8 parts (by weight) of a wetting agent selected from the group consisting of methacrylic acid, acrylic acid and acrylamide; from about 3 to about 8 parts (by weight) of a cross-linker selected from the group consisting of ethylene glycol-dimethacrylate and butyleneglycol-dimethacrylate; and from 0.1 to about 0.5 parts (by weight) of a catalyst/initiator selected from the group consisting of di(2-phenyloxyethyl)-peroxy dicarbonate; α,α',-azobisisobutylronitrile, and methylethylketoneperoxide and cobalt naphthanate.

3. A composition according to claim 2 in which said initiator is methylethylketoneperoxide and cobalt naphthanate.

4. A composition according to claim 2 in which said catalyst/initiator is α,α',-azobisisobutylronitrile.

5. A composition according to claim 4 in which said cross-linker is ethylene glycol dimethacrylate.

6. As a new article of manufacture, a contact lens fabricated from the copolymer composition of claim 1.

7. As a new article of manufacture, a contact lens button fabricated from the copolymer composition of claim 2.

8. As a new article of manufacture, a contact lens fabricated from the button of claim 7.

* * * * *